(12) United States Patent
Pepper et al.

(10) Patent No.: US 8,229,304 B1
(45) Date of Patent: Jul. 24, 2012

(54) PHASE CONTROL OF A FIBER OPTIC BUNDLE

(75) Inventors: David M. Pepper, Malibu, CA (US); Monica Minden, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 603 days.

(21) Appl. No.: 12/433,051

(22) Filed: Apr. 30, 2009

(51) Int. Cl.
H04B 10/06 (2006.01)

(52) U.S. Cl. ........ 398/214; 398/162; 398/209; 398/210; 398/202

(58) Field of Classification Search .................. 398/177, 398/178, 97, 162, 37, 202, 214, 208–210; 359/337.11, 337.12, 337.13
See application file for complete search history.

(56) References Cited

U.S. PATENT DOCUMENTS

| | | | | |
|---|---|---|---|---|
| 5,077,821 A * | 12/1991 | Makel et al. | ................... | 385/120 |
| 5,233,673 A | 8/1993 | Vali et al. | | |
| 5,930,030 A * | 7/1999 | Scifres | ....................... | 359/341.3 |
| 6,101,024 A * | 8/2000 | Islam et al. | ................... | 359/334 |
| 6,151,522 A | 11/2000 | Alfano et al. | | |
| 6,233,085 B1 | 5/2001 | Johnson | | |
| 6,373,625 B1 * | 4/2002 | Kobayashi et al. | ....... | 359/341.41 |
| 6,400,871 B1 * | 6/2002 | Minden | ........................... | 385/39 |
| 6,760,512 B2 | 7/2004 | Pepper | ............................. | 385/27 |
| 6,882,781 B2 * | 4/2005 | Ionov | ............................... | 385/48 |
| 7,114,393 B2 * | 10/2006 | Langdon | ......................... | 73/643 |
| 7,283,751 B2 * | 10/2007 | Bruesselbach et al. | ....... | 398/119 |
| 7,382,465 B1 * | 6/2008 | Pepper | ........................... | 356/485 |
| 7,457,326 B2 * | 11/2008 | Rogers et al. | ..................... | 372/6 |
| 7,599,405 B2 * | 10/2009 | Rogers et al. | ..................... | 372/6 |
| 7,974,543 B2 * | 7/2011 | Khurgin et al. | ................ | 398/212 |

\* cited by examiner

*Primary Examiner* — Kenneth N Vanderpuye
*Assistant Examiner* — Hibret Woldekidan
(74) *Attorney, Agent, or Firm* — Ladas & Parry

(57) ABSTRACT

A coherent laser receiver for receiving encoded light which may have propagated over an aberrated path, situated between a source of the encoded light and the coherent receiver. The coherent laser receiver comprises a bundle of optical fibers arranged in an array to receive light, as encoded from a distant optical transmitter or reflective surface, the encoded light from the distant optical transmitter or reflective surface is received by at least a majority of the fibers in the array. A plurality of light amplifiers is provided for amplifying the received encoded light. A control apparatus coherently combines a composite output of the bundle of optical fibers, the control apparatus includes at least one detector for detecting the a portion of the received encoded light, an output of the at least one detector being utilized to control the plurality of light amplifiers so that differential phases among individual fibers associated with said at least one detector in the bundle are minimized by said light amplifiers. A coherent detector is responsive to the composite output of the bundle for providing an output signal representative of the encoded information from the source.

24 Claims, 7 Drawing Sheets

PHASE CONTROL OF A FIBER OPTIC BUNDLE

CROSS REFERENCE TO RELATED PATENTS

This application is related to U.S. Pat. No. 6,400,871, which issued Jun. 4, 2002 and which patent is owned by the assignee of this application. The disclosure of U.S. Pat. No. 6,400,871 is hereby incorporated herein by reference and is referred to herein as simply "Minden". This application is also related to U.S. Pat. No. 7,382,465, which issued Jun. 3, 2008 and which patent is owned by the assignee of this application. The disclosure of U.S. Pat. No. 7,382,465 is hereby incorporated herein by reference and is referred to herein as simply "Pepper".

TECHNICAL FIELD

This invention is directed to a coherent optical receiver for temporally encoded optical beams with high-sensitivity, with the concomitant ability to compensate for wavefront distortions, either static or dynamic in nature (e.g., turbulent atmospheric distortions). An array of fiber amplifiers upstream of a coherent detector provides both enhanced detection performance (as a result of low-noise amplification) as well as adaptive optical phasing of the fiber array and, in general, of a highly distorted incident beam.

BACKGROUND INFORMATION

One use of the technology disclosed herein is to realize the ability by which one can remotely detect the presence of an optical beam which may contain temporal information, such as phase modulation, amplitude modulation, and vibrations of an object (the latter using non-contacting techniques involving a laser beam and an optical detection apparatus). One advantage of using the technology disclosed herein is that one can, for example, use it to measure very small phase shifts, including vibrations, on the order of fractions of an optical wavelength in amplitude, over a frequency range on the order of Hz to MHz or more. This minute displacement detection sensitivity corresponds to a phase-modulated optical beam, whose depth-of-modulation is on the order of 0.001 or less. Another advantage is that this system enables high-performance remote sensing and optical communications to be realized using eye-safe wavelength beams (1.5 μm). Yet another advantage of using this technology is that it enables one to detect vibrations from non-specular objects (e.g., surfaces with roughness features on the order of optical wavelengths) that reflect an incident optical beam into a diffuse set of angles, resulting in a highly speckled pattern of small spots. Still yet another advantage of using the technology disclosed herein is that the receiver possesses a set of high-gain, low-noise optical amplifiers as a front-end means to amplify the diffusely scattered beam that enters the receiver, thereby improving the shot-noise-limited sensitivity by two orders of magnitude relative to a conventional multi-speckle compensated vibrometer.

Yet another advantage of using the technology disclosed herein is that a system can be employed as a coherent receiver that can compensate for both static and dynamic propagation distortions imposed upon an incident optical signal, including, as an example, optical aberrations resulting from atmospheric turbulence, poor-optical quality elements, and differential phase shifts due to mechanical vibrations and/or thermal perturbations imposed onto the fiber array receiver itself.

The technology disclosed herein has potential use for remote sensing of vibrating objects without the need for physically contacting the surface under test. Thus a vibrometer can be used for remote sensing of threats (e.g., an Unmanned Aerial Vehicle (UAV) can interrogate objects down on the ground such as tanks, minefields, etc.; or, a ground-based platform, say, with a Directed Energy Weapon (DEW), can interrogate incoming threats to assess its functionality and operational state). In addition, this vibrometer can be used to interrogate objects on the ground (from an airborne location) to ascertain the nature of the materials that comprise the object in question, and, hence classify the object in terms of its functionality (in this case, a second laser, in conjunction with the device disclosed herein, can be employed to excite photo-acoustic modes in the material under interrogation). In addition, one can use the technology disclosed herein for real-time, manufacturing in situ process control, as well as in-service inspection of materials (structures, welds, bonds, etc.) and life-cycle evaluation of smart materials, the latter case referred to as health monitoring of infrastructures via "inspection on demand".

The prior art includes single-speckle vibrometers as well as multi-speckle, compensated vibrometers. In the former case, a laser beam impinges on the object under test, and the receiver is designed to receive a single spatial mode, or speckle, which is then directed into a coherent detector (either a homodyne or heterodyne system). This system can be shot-noise limited in sensitivity. Nonetheless, its overall performance is reduced by ≈30 dB over multi-speckle receivers, since it is only capable of processing a single speckle, or spatial mode. The technology disclosed herein enables one to process many speckles, thereby enhancing the performance of the system. In the latter case, there exist a variety of multi-speckle vibrometer devices, such as self-referencing receivers (using a Fabry-Perot resonator as a multi-speckle FM discriminator), as well as multi-speckle vibrometers with adaptive optical front-end devices (such as 2-wave mixers, Spatial Light Modulators (SLMs), photo-emf sensors, etc.). In these cases, multiple speckles can be processed, but, at the expense in terms of sensitivity (the Fabry-Perot resonator), noise and throughput (in the case of 2-wave mixers), and sensitivity in excess of the shot-noise limit (the photo-emf devices). The technology disclosed herein enables one to realize shot-noise limited sensitivity, with improved performance beyond existing systems (owing to the front-end low-noise amplifiers), and with wavefront-compensation capability. The enhancements derive from the fact that the low-noise front-end fiber amplifiers also provide for adaptive optical compensation of wavefront distortions.

One aspect of the prior art involves single-speckle vibrometers. Another aspect involves multi-speckle vibrometers, but for these devices the front-ends are either totally passive in nature (such as the self-referencing Fabry-Perot resonators) or, at best, active in the sense that a collection of multiple speckles are processed via beam cleanup or real-time holography. However, it is believed that in none of these multi-speckle-based vibrometers is the notion of front-end amplification discussed or implied, rather the prior art focuses on methods to deal with the highly diffuse and speckled incident beam, without further active processing in such devices. The technology disclosed herein goes beyond the prior art, in that it not only provides a way of processing a highly speckled incident beam, for example, but, also, at the same time, the technology disclosed herein adds low-noise gain for enhanced shot-noise limited sensitivity by approximately 20 dB (fiber amplifiers can provide small signal gains at ≈40 dB without parasitics).

Another aspect of using the technology disclosed herein is that one can realize an effective large input aperture to an optical receiver or telescope without the need for a possibly costly, massive, highly polished transparent lens or mirror of high optical quality at the input plane. In essence, an array of coherently combined optical fibers essentially replaces a single, large optical element. Moreover, optical fibers are lightweight (low mass and small moment of inertia), highly flexible and readily available as low-cost elements. Hence, the technology disclosed herein can be employed to replace costly, bulky massive optical elements that would otherwise require secure and vibration-free mounting in high-cost gimbal devices for beam steering. The technology disclosed herein, owing to low moments of inertia and flexibility, can be serviced by or utilize a compact, low-cost gimbal requiring a low torque driver for beam steering. Finally, given the use of a large array of fibers, the technology disclosed herein can perform in the face of fiber failures, resulting in a graceful degradation of the receiver over its in-service lifecycle. By complete contrast, a damaged or shattered optical lens would, most likely, result in a non-functional optical system.

BRIEF DESCRIPTION OF THE DISCLOSED TECHNOLOGY

The technology disclosed herein relates to a coherent laser receiver that can realize diffraction-limited, shot-noise-limited performance. The receiver includes a bundle of optical fibers arranged in an array, wherein the fibers in the array are arranged to receive light, as encoded from a distant optical transmitter or reflective surface. The term "reflective surface" as used herein is intended to include any surface from which an incident optical beam returns light, the surface ranging from a specular mirror-like surface to a rough surface which returns highly diffuse light. The encoded beam is preferably received by a majority of the fibers in the array; a plurality of light amplifiers and detectors for amplifying and detecting the received light; and a coherent detector responsive to the detected light for providing an output signal representative of the encoded information from the source. The encoded light, in general, may have propagated over an aberrated path, situated between the source and the coherent receiver. Examples of such path-distortions include turbulent atmospheres, poor-quality optical components, propagation through multi-mode optical fibers or propagation through an array of single-mode fibers whose differential length leads to a concomitant, differential optical phase shift exceeding a small fraction of a radian. In these cases, the light impinging at the input aperture of a coherent optical receiver will be highly wavefront distorted. Without some form of wavefront correction, the signal-to-noise performance of such an optical link can be degraded by 30 dB or more, or equivalently, the communication bandwidth of the receiver can be similarly degraded, for a given modulation format.

In one aspect the technology disclosed herein provides A coherent laser receiver for receiving encoded light which may have propagated over an aberrated path, situated between a source of the encoded light and the coherent receiver, the coherent laser receiver comprising: a bundle of optical fibers arranged in an array, wherein the fibers in the array are arranged to receive light, as encoded from a distant optical transmitter or reflective surface, the encoded light from the distant optical transmitter or reflective surface is received by at least a majority of the fibers in the array; a plurality of light amplifiers for amplifying the received encoded light; a control apparatus for coherently combining a composite output of the bundle of optical fibers, the apparatus including at least one detector for detecting the a portion of the received encoded light, an output of the at least one detector being utilized to control the plurality of light amplifiers so that differential phases among individual fibers associated with said at least one detector in the bundle are minimized by said light amplifiers; and a coherent detector responsive to the composite output of the bundle for providing an output signal representative of the encoded information from the source.

In another aspect the present invention provides a coherent laser receiver for receiving encoded light which may have propagated over an aberrated path, situated between a source of the encoded light and the coherent receiver, the coherent laser receiver comprising: a bundle of optical fibers arranged in an array, wherein the fibers in the array are arranged to receive light, as encoded from a distant optical transmitter or reflective surface, the encoded light from the distant optical transmitter or reflective surface is received by at least a majority of the fibers in the array; a plurality of light amplifiers for amplifying the received encoded light; a control apparatus for coherently combining a composite output of the bundle of optical fibers, the apparatus including a single detector for detecting the a portion of the composite output, an output of the single detector being utilized to control the plurality of light amplifiers so that all differential phases among individual fibers in the bundle are minimized by the plurality of light amplifiers; and a coherent detector responsive to the composite output of the bundle for providing an output signal representative of the encoded information from the source.

In yet another aspect, the present invention provides a coherent receiving method for coherently receiving encoded light which may have propagated over an aberrated path, situated between a source of the encoded light and a coherent laser receiver, the coherent receiving method comprising: providing a bundle of optical fibers arranged in an array, wherein the fibers in the array are arranged to receive light, as encoded from a distant optical transmitter or reflective surface, the encoded light from the distant optical transmitter or reflective surface being received by at least a majority of the fibers in the array; amplifying the received encoded light in a plurality of light amplifiers each associated with one of the fibers in said bundle; coherently combining a composite output of the bundle of optical fibers by a control apparatus having at least one detector for detecting the a portion of the received encoded light, an output of the at least one detector being utilized to control the plurality of light amplifiers so that differential phases among individual fibers in the bundle are minimized by said light amplifiers; and coherently detecting the composite output of the bundle for providing an output signal representative of the encoded information from the source.

In still yet another aspect, the present invention provides a coherent receiving method for coherently receiving encoded light which may have propagated over an aberrated path, situated between a source of the encoded light and a coherent laser receiver, the coherent receiving method comprising: providing a bundle of optical fibers arranged in an array, wherein the fibers in the array are arranged to receive light, as encoded from a distant optical transmitter or reflective surface, the encoded light from the distant optical transmitter or reflective surface being received by at least a majority of the fibers in the array; amplifying the received encoded light in a plurality of light amplifiers each associated with one of the fibers in said bundle; coherently combining a composite output of the bundle of optical fibers by a control apparatus having a single detector for detecting the a portion of the composite output, an output of the at least one detector being utilized to control the plurality of light amplifiers so that differential phases among individual fibers in the bundle are minimized by said light amplifiers; and coherently detecting the composite output of the bundle for providing an output signal representative of the encoded information from the source.

The foregoing summary is not intended to be inclusive of all aspects, objects, advantages and features of the presently disclosed technology nor should any limitation on the scope of the technology be implied there from. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

DETAILED DESCRIPTION

1. Basic System Components and Subsystems

Figure 1:
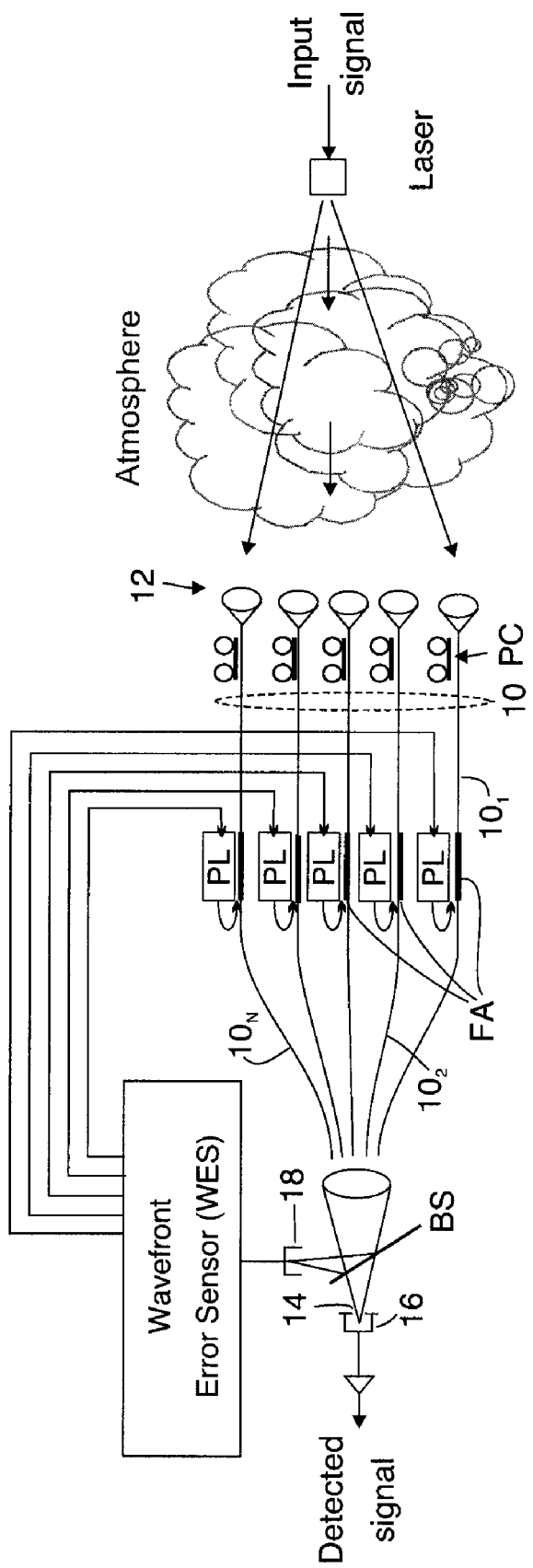
FIG. 1 is a schematic diagram of a compensated optical fiber receiver system according to the presently technology disclosed herein assuming an optical source located at the initial end of the link. The optical amplifiers can be optically pumped, doped optical fibers, or optical fiber amplifiers using stimulated scattering (Stimulated Raman Scattering (SRS), Stimulated Brillouin Scattering (SBS), Stimulated Thermal Scattering (STS), Stimulated Photo-Refractive Scattering (S P-R S)). The fibers can be solid core, holey fibers, or hollow-core photonic crystal fibers. The optical pump sources can be fiber lasers, laser diodes (semiconductor, quantum cascade, etc.), etc. The phase shift of light passing through the fibers is controlled via changes in the optical pump power that drives the fiber amplifiers. The applied independent optical phase shifts to each subaperture necessary to realize diffraction-limited performance can be provided via closed-loop control techniques or via feed-forward control such as through the use of genetic algorithms. In this free-space feedback example, the diffraction-limited output power is designed to be at a maximum level upon convergence.

The basic fiber receiver architecture 125, as shown in FIG. 1, comprises a fiber bundle 10 with optical amplification capability, an optional lenslet array 12 with each lenslet preferably placed or bonded at the input end of each respective fiber $10_1$-$10_N$ in the bundle 10 (to determine the geometrical fill factor versus the system field-of-view—well-known in the art), an optical gimbal onto which the fiber bundle 10 is attached to determine the required system field-of-regard, a fiber amplifier FA spliced to each fiber $10_1$-$10_N$, a laser pump source PL bonded/coupled into each respective fiber amplifier FA (which, in addition to providing optical gain, is used to control the optical phase shift in each respective fiber), a polarization controller PC for each fiber in the bundle 10 (unless one employs a bundle of co-aligned, polarization-preserving fibers), a means to sense the relative optical phase shift of each beam that emerges from each of the fibers relative to the other fibers, a means to process the ensemble of detected relative optical phase shifts, and a means to employ this phase-shift information to independently servo-control each of the fibers with a feedback-loop controller or a feed-forward algorithm, and an output detector to extract the desired information encoded onto an input optical beam to the fiber receiver. The input beam is encoded in the time domain, with a suitable modulation format (such as AM, FM, PM, PPM, PSK, etc).

Each lenslet in the lenslet array 12 couples a portion of an incident, free-space optical beam into its respective fiber $10_1$, $10_2, \ldots, 10_N$ in bundle 10. The diameter of each lenslet is based on a trade-off between the need to realize a large "fill factor" of an incident beam, versus the field-of-view of the array: e.g., a large diameter lenslet enables collection of the most light, but, with the smallest diffraction-limited Field Of View (FOV) (FOV≈wavelength/diameter). On the other hand, an array of smaller diameter lenslets will not fill all the area within the fiber array; hence, not all the incident light will be coupled into the fiber bundle (i.e. a thinned receiver array). However, the array of smaller-diameter lenslets will enable a greater diffraction-limited detection FOV.

The optimal number of fibers, N, will depend on the intended applications, specifications and complexity of the receiver. As an example, the greater the number of fibers, the greater the number of resolvable angles within the FOV. This detail pertains to the precision by which the receiver can spatially resolve a given remote transmitter. In addition, the greater the value of N, the more gracefully the system will degrade over time. Also, less optical power per pump laser is required for large N. Moreover, for free-space optical links over an aberrated path (such as the earth's atmosphere), the value of N must be on the order of, or greater than, the number of transverse coherent patches that characterize the degree of path distortion, as received by the overall aperture of the coherent fiber receiver. The minimum number of fibers necessary to establish a given level of system performance is, in part, governed by Nyquist sampling considerations.

Figure 2:
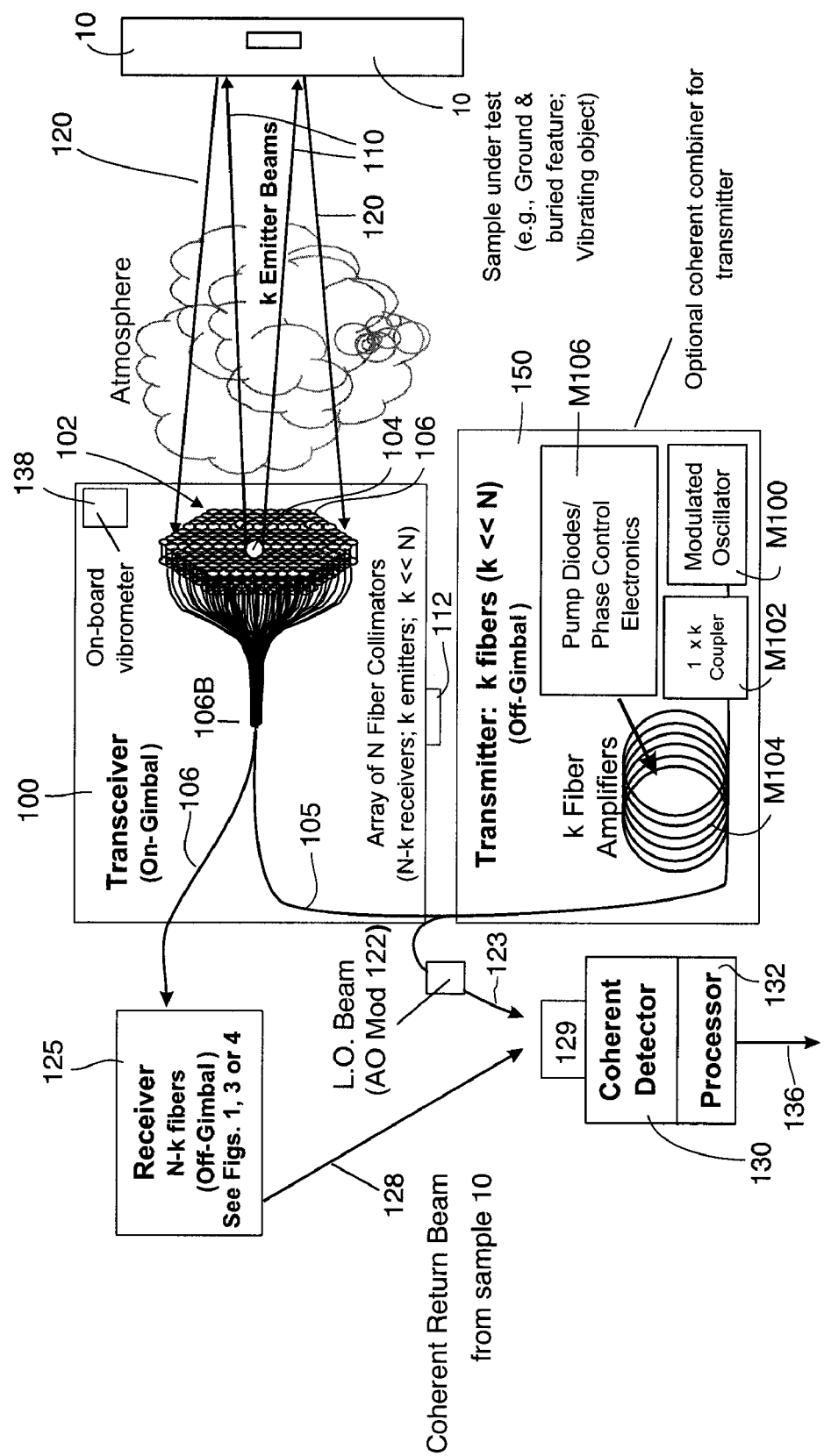
FIG. 2 is a schematic diagram of a compensated vibrometer using an embodiment of the compensated receiver system as described with reference to FIG. 1, 3 or 4.

Each fiber $10_1, 10_2, \ldots 10_N$ is spliced to a polarization controller PC, followed by a fiber amplifier FA, each of which is optically pumped by an independent laser source PL, such as a laser diode or optical fiber. Each pump-laser PL provides optical gain for each respective fiber amplifier FA and, moreover, enables control of the optical phase shift experienced by an input signal to the respective fiber coupled to each fiber $10_1, 10_2, \ldots 10_N$, a means to sense the relative phase shift that an input beam in one fiber experiences with respect to one or more of the other fibers in the array (or, bundle) of fibers; and, finally, a suitable receiver the processes the-now coherent output beam that emerges from the fiber array 10, thereby revealing the temporal information encoded on the incident beam that is incident upon the multiple-fiber receiver. (The fiber-based phase-control concept is described in the prior patent of Minden for the coherent power scaling of fiber amplifiers in a multiple-fiber transmitter configuration.) A compensated laser vibrometer system using the basic fiber array of FIG. 1 may be utilized as shown in FIG. 2. The system of FIG. 2 combines the present compensated receiver (of FIG. 1, for example, or alternatively, of FIG. 3 or 4) with a phase-controlled fiber array transmitter, the latter of which is described by Minden. For a detailed description of FIG. 2, the reader should consult Pepper, except for the receiver 125, which is described herein with reference to the embodiments of FIGS. 1, 3 and 4.

FIG. 1 shows a linear lenslet array 12. By extension, each linear array 12 in FIG. 1 can be coherently combined with a plurality of corresponding, adjacent linear arrays 12 in order to build up an effective two-dimensional aperture 102 as depicted by FIG. 2. Referring again to FIG. 1, preferably the lenslet array 12 would be configured as a two dimensional array of lenslets and the WES would serve all of the lenslets in such a two-dimensional array.

2. Embodiments to Realize a Phase-Coherent Output Beam from the Array, Configured to Detect Temporal Information, which has been Encoded onto an Incident, Free-Space Beam In the embodiments described below, it is assumed that the information at the transmitter end of the link is encoded in the time domain onto an optical beam without any spatial information (spatial-domain encoding, or, image transmission, is discussed in Section 5 below). As an example, the beam at the transmitter can be a plane wave, or a focused beam, directed towards the receiver, as depicted by the laser and input signal labels on the right-hand side of FIGS. 1 and 3, and, as shown in FIG. 4, labeled as 120 on the left-hand side of FIG. 4. The encoded beam consists of a single spatial optical mode at the transmitter, and, encoded with temporal information, in the form of modulation, such as AM, FM, PM, PPM, PSK, etc. As the modulated beam traverses the path to the optical receiver, it is assumed that its wavefront is distorted due to a variety of undesirable propagation effects, including atmospheric turbulence. The goal at the (fiber-bundle based) receiver front-end of the link is to coherently amplify the received beam, and, concomitantly, to "undo" the wavefront distortions acquired upon propagation through the atmosphere as well as acquired upon propagation through the fiber bundle itself. In this case, the detector and demodulator "sees" an undistorted, amplified, yet modulated, beam, free of wavefront errors. That is, the modulated laser beam at the detector appears as if it propagated through a distortion-free path, such as a vacuum, limited only by fundamental diffractive effects. This state of affairs results in a high-performance, diffraction-limited communications link, maximizing the bandwidth and signal-to-noise of the detector to its fundamental shot-noise limit. Four embodiments describing methods to measure and, subsequently, to compensate for propagation errors using this N-fiber receiver bundle immediately follow. This is followed by a description of a laboratory reduction to practice of one of the four embodiments. A brief discussion regarding preferred embodiments is provided afterwards. The fiber bundle in this set of embodiments (i.e. whose goal is to detect temporally encoded signals), need not maintain a one-to-one spatial mapping of the input face of the bundle with respect to the output face. That is, the fiber bundle 10 can be of either a so-called "coherent" or "incoherent" class of multi-fiber arrays in a spatial sense.

2a. Wavefront Error Sensing and Control Using Multi-Dither Techniques.

In the case of multi-dither techniques, each of the N fibers in the bundle 10 is identifiable relative to the other fibers via "frequency-tagging" via modulation of the pump laser for each fiber, or, pixel. Each fiber $10_1, 10_2, \ldots 10_N$ is encoded with a different, unique modulation frequency. See FIG. 1 or 3. The dither encoding is in the form of a low-index modulation signal that rides on top to the adjustable pump-laser power level. All the N output beams are directed to a single output detector 16, via free-space focusing or guided-wave combining of all the output beams onto the detector 16, with a sample of the same split off and directed to a wavefront error sensor (WES), the latter used to determine the necessary phase shifts to be applied to each of the fibers to compensate for path distortions. Examples of beam-combining elements include optical telescopes and beam splitters, N×1 fiber couplers, or N×2 fiber couplers, so that all the fibers in the bundle are essentially coherently summed at the detector 16 and at the detector 18 associated with the WES. The system also includes a post-processor (the WES) that channelizes each frequency-labeled detected beam, and calculates the differential optical phase shift required for each fiber in the bundle 10 to maximize the coherently combined power incident onto the output detector 16. The required optical phase shift is applied to each fiber $10_1, 10_2, \ldots 10_N$ via the depicted feedback paths by controlling the respective pump-laser power level for the given fiber. This results in an adjustable, unique, optical phase shift imposed onto each beam that traverses its respective fiber. The information required to determine the set of necessary phase shifts is derived by the detector 18. By minimizing the signal at the WES detector 18, via the feedback system, the signal at the detector 16 is maximized by the conservation of energy principle. An example of a basic system that utilizes an optical combining approach at the summation point consisting of a lens with a diffraction-limited pinhole 14 is front of a detector 16 is shown in FIG. 1.

Figure 3:
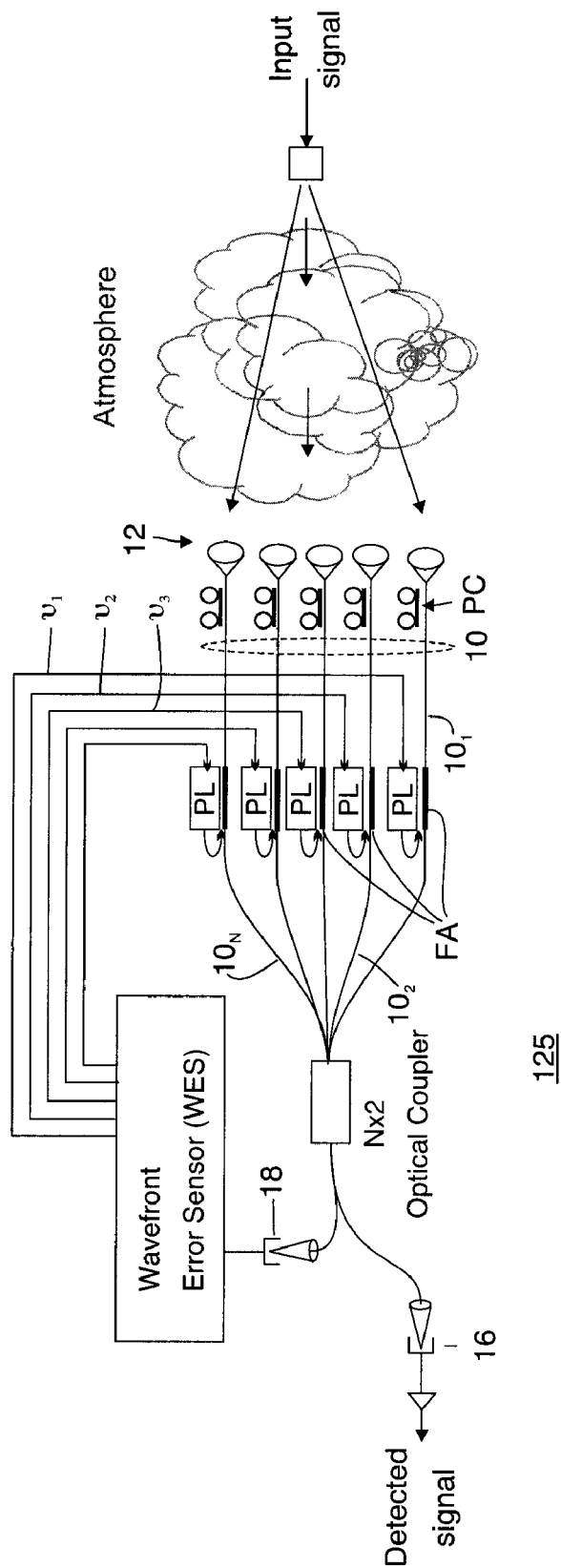
FIG. 3 is a schematic diagram of a preferred embodiment of the compensated receiver employing multi-dither techniques as applied to a single optical feedback detector using consisting of N input apertures and one "N×2" optical fiber coupler. In this example, each feedback loop is frequency tagged ($v_1, v_2, \ldots v_N$) and the loop is designed to converge at a null input level to the wavefront error sensor, W.E.S., detector resulting in a maximum detected signal level to the receiver detector. In this embodiment of the compensated receiver, multi-dither techniques are used, as applied to a single optical feedback detector.
Figure 4:
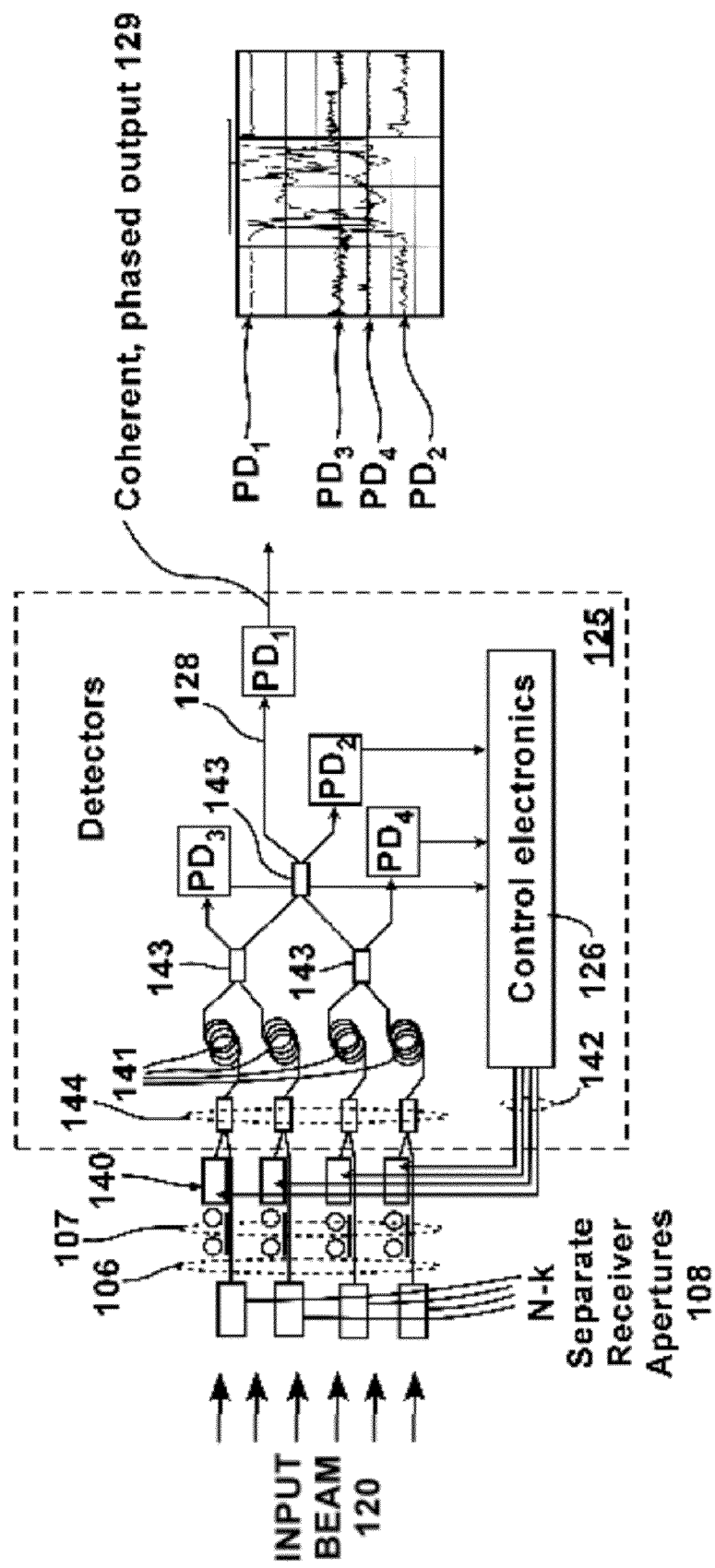
FIG. 4 is a schematic diagram of a proof-of-principal demonstration of a compensated optical fiber receiver employing a multi-layer architecture, consisting of N input apertures and (N−1) "2×2" fiber couplers and the same number (N−1) of servo-controllers. In this embodiment of the compensated receiver, multi-dither techniques are used, as applied to (N−1) parallel optical feedback detectors, each detector servicing a given fiber coupler.

This approach (wavefront error sensing and control using multi-dither techniques) may also be used with the embodiment of FIG. 3. In this embodiment, with an N×2 coupler, all N input fibers couple into one overall port of the coupler at the summation point (i.e., the back end of the fiber array). The output port of the coupler consists of two ports. One of the summed outputs is incident onto an optical detector 18, whose signal is fed into a Wavefront Error Sensor (WES) servo-control system, which then processes the received beams. This processor (the WES) calculates the required set of phase control levels that will minimize the fiber-coupler output 18. When this condition converges (after k iterations of the closed-loop system), essentially all the laser output will emerge from the other output fiber leg of the N×2 coupler, which forms the useful output to be ultimately detected to demodulate the overall detected signal 16. This is a preferred embodiment, given its simplicity, (fewer) number of optical components, and the fact that a guided-wave network of fibers is employed throughout the system, from the front-end amplifier array to the fiber output fiber (i.e., no free-space components are required, and no optical position adjustments are required). This all-guided-wave (e.g., fiber) based system is rugged, compact, easily housed in a simple package/module, essentially alignment-free, and is more environmentally robust—no exposure to dust, vapors, condensation, etc. Some embodiments may include diffraction-limited apertures placed at the focal plane of a lens followed by an optical detector 18, whose output is directed to the Wavefront Error Sensor (WES). In this latter (focusing) configuration, typical systems are designed to maximize the diffraction-limited detected beam (as opposed to typical optical fiber schemes that are designed to converge to a null signal level at the output port to the WES). An all-optical fiber system can be employed that uses an N×2 optical coupler, whose (N) input and (2) output fibers consist of single-mode fibers. In this preferred embodiment, the use of single-mode fibers guarantees diffraction-limited performance at convergence of the WES control system, and, thus no free-space components (lenses, pinholes, etc.) are required in the overall feedback system.

2b. Wavefront Error Sensing and Control Using Phase Front Mapping.

Wavefront error sensing and control using phase front mapping may be used with the FIG. 1, instead of using the multi-dither approach described above. In this embodiment the light emerging from the output end of the multi-fiber bundle array is imaged onto a Wavefront Error Sensor WES (which may be a Shack-Hartmann WES). In this case, the detector 18 corresponds to a multi-pixel detector (e.g., a CCD detector, a micro-channel plate photo-multiplier array, etc.). This class of WES calculates the composite output equi-phase surface of the entire output beam; that is, it determines the shape of the overall wavefront that collectively emerges from the composite fiber array. The propagation-path optical distortions are manifested in the non-planar topology of the reconstructed wavefront (i.e., a perfect, diffraction-limited beam would be a planar wavefront). A post-processor then calculates the set of phase shifts necessary to be imposed onto each of the fibers, so that the servo-system converges to a planar output wavefront. The planar wavefront is indicative of a diffraction-limited composite output beam. Since the WES determines the optical wavefront map via a variety of wavefront reconstruction algorithms, a multi-dither approach is not required for this embodiment.

2c. Wavefront Error Sensing and Control Using Genetic Algorithms.

In this approach, as shown in FIG. 1, a genetic algorithm is employed to determine the required phase shifts that are to be imposed onto each fiber in the array bundle. The WES processor utilizes a software package that employs a genetic algorithm mathematical approach to optimize the system performance. As is well-known in the prior art, genetic algorithms proceed through a sequence of steps, such as (1) a "training process" that selects a given set of phase shifts to be imposed onto the array; (2) measures the goodness of the multi-pixel combined output beam for the given set of phase shifts (via multi-dither or via WES measurements); (3) records and tabulates the wavefront quality for each set of applied phase shifts; and (4) determines the optimal set of phase shifts from the ensemble of measurements and applies this set of values to the fibers in the bundle—all in real-time. Ideally, the multi-pixel output beam emerges as a nearly diffraction-limited coherently combined beam, which is incident onto a single detector, in the form of a single-spatial-mode beam. The essence of the genetic algorithm is in the intelligence of the software to determine the path to optimize the desired output in the least number of iterations.

2d. Wavefront Error Sensing and Control Using an Ensemble of 2×2 Fiber Couplers.

In this embodiment shown in FIG. 4 (which appears as FIG. 2 in Pepper), each given pair of N single-mode output fibers of the bundle is combined via a respective 2×2 fiber coupler 143, forming a group of N/2 fiber-coupled beams. One of the N/2 coupler-outputs with another respective output from an adjacent 2×2 fiber coupler 143 is then combined into a subsequent group of 2×2 fiber couplers, resulting in a group of N/4 fiber-coupled beam, and, so on, until a single 2×2 fiber coupler 143 remains. The other outputs from each of the 2×2 couplers are detected and form a collection of parallel servo controlled loops as discussed below. Hence, a "tree-architecture" is configured so that each "layer," or "tier," of the architecture sums a pair of final outputs from each upstream fiber coupler. That is, each respective 2×2 output is combined with another such 2×2 coupler output, thereby forming the next layer of the tree-pattern, etc. A binary progression of decreasing "tree branches" results, with a single 2×2 fiber coupler forming the last layer of the overall tree-pattern. The total number of required 2×2 couplers, given a system of N fibers, will therefore be equal to N−1 coupling elements. As an example, a system of 128 fibers will require 127 couplers as well as 127 optical detectors. A set of independent servo-loop controllers is employed in the system, with a single, unique servo loop dedicated for each given fiber pair (i.e., each 2×2 fiber coupler). For each loop, the differential optical phase shift of each fiber pair incident onto its respective 2×2 coupler is controlled so that, upon convergence, the light detected at each respective detector is minimized (driven to zero) such that, by the conservation of energy principle, all the light emerges from only a single output port of each respective coupler. A unique dither-frequency "tag" is applied to control each respective 2×2 coupler, with a matching filter for each associated feedback loop processor, so that its dedicated feedback controller can be distinguished from the remaining servo loops. Upon convergence of the entire system, essentially all the light (subject to parameters such as the servo-loop gain) emerges from a single fiber 128 at the base of the tree, which is detected by photodetector $PD_1$ whose electrical output 129 is the desired coherent, phased output of the entire coherent receiver system. Hence, all the fibers in the N-fiber bundle, are in effect, coherently combined into a one single-mode composite beam in fiber 128. This single-mode beam is then incident upon the detector/demodulator $PD_1$. This embodiment was reduced to practice, as described in the next paragraph.

2e. Reduction to Practice: Coherent Control of Fiber Bundle Array Using an Ensemble of 2×2 Fiber Couplers (Described in Section 2d)

The embodiment discussed immediately above has been practiced by the inventors at HRL Laboratories in Malibu, Calif., and that effort has demonstrated the system's capability to coherently combine four single-mode channels (N=4 in FIG. 4) into one single-mode coherent output beam. An effective communications link was established over a laboratory scale free-space propagation path. As shown in FIG. 4, the link consisted of a single-mode transmitter 120, a short free-space path, and a receiver 125. The effective receiver input aperture 108 consists of a bundle of four single-mode optical fiber amplifiers 141, which function as a set of four distributed sub-apertures with coherent amplification and with a controllable optical phase shift.

A polarization controller 107 was provided for each fiber 106 in the array to assure that all optical beams were co-polarized.

The amplified received beam that emerges from a given pair of fiber amplifiers is coupled into a 2×2 fiber coupler 143. Since there are four fibers in the bundle in this demonstration, two fiber couplers are required for the first layer of the tree architecture; a third 2×2 fiber coupler then combines the outputs of the upstream pair of 2×2 couplers. Each coupler has two output ports: One output port is coupled into the next stage of the system. The other output port provides light to complete its respective servo controller. The system is configured so that the differential phase shift for each fiber pair is dynamically controlled so that a minimal amount of light is incident onto the "undesired" optical path. In this case, the "undesired" outputs provide the light incident onto servo-controlled detectors $PD_2$, $PD_3$, and $Pa_r$. By conservation of energy, once this condition is met, all the light from the "tree architecture" will emerge into the direction of detector $PD_1$.

For each fiber pair, phase control is adjusted in real time via the power of the laser pumps modules 140. The laser pump light is coupled into the fiber amplifiers via fiber couplers 144, as is known in the art. That is, the DC current supplied to each pump laser 140 determines the gain of each fiber amplifier 141. The pump laser output power also controls the phase shift of the signal light as it traverses each respective fiber amplifier 141. In addition to this DC current level, each fiber is "frequency tagged" at a different frequency, by modulating the laser pump current in output power. The depth-of-modulation is relatively low and is referred to as a "dither frequency." This amplitude modulation of the pump laser results in a corresponding phase modulation, which is imposed onto the light that is amplified by each fiber amplifier. The electrical modulation current that drives the respective pump lasers is generated within a set of respective phase-locking amplifiers in the control electronics module 126. This unique dither modulation frequency is also used as a "reference" frequency internal to each lock-in amplifier. Each respective lock-in amplifier housed in 126 serves as a narrowband filter to measure the relative power of the desired optical beam in its respective feedback loop 142.

Consider one of the pairs of fibers. The light that emerges from the detector $PD_3$ is the square of the sum of all the modulated optical fields from the pair of fibers that emerge from its respective 2×2 fiber coupler 143. The modulation signals, as driven by the frequency tagged dithers, are imposed on the respective pair of fiber amplifiers 141 via pump lasers 140. The electrical signal output of this detector can be viewed as a heterodyne output signal, and, consists of several modulation sidebands: one at the first dither frequency, a second sideband at the second dither frequency, and a third sideband at the difference of the two (different) dither frequencies.

The output from detector $PD_3$ is directed to its respective phase-locked amplifier within 126. The lock-in amplifier functions by comparing the input signal against its internal reference, with a well-defined electronic phase shift (this comparison can be accomplished by electronically beating the internal reference against the input signal and temporally integrating the resultant output). Given a finite lock-in amplifier integration time, only the frequency component of the input signal that overlaps the frequency and phase of the internal reference yields a measurable beat frequency (other frequency components, as well as those with arbitrary phase, in the signal input spectrum are averaged out by the temporal integration time).

Each lock-in amplifier, $LA_n$, (not explicitly depicted), within control electronics 126, being a coherent detector, can provide both the magnitude of the signal at the internal reference, as well as the relative phase between the reference and signal input. The electrical outputs of $PD_2$-$PD_4$ each provide a respective electrical input to a corresponding lock-in amplifier $LA_2$-$LA_4$ This information is then used to adjust the overall DC current level that drives the laser pump module 140 connected to $LA_3$, for example. Any other modulation component, say, the dither frequency that modulates that phase of the second input signal light (as controlled by the output of $LA_2$), will be averaged out to zero, by virtue of the effective narrow passband of $LA_3$. Therefore, any "noise" in the laser output power spectrum that strikes $PD_3$ will be averaged out to zero, with only the signal component at the "reference" frequency and phase surviving. This same argument can be made for each pair of optical beams that are combined by each 2×2 fiber coupler in the linear (1-d) array. Since each $LA_n$ samples a specific dither frequency, all the control systems can function in parallel, thereby eliminating "cross talk," which would otherwise result in system instabilities.

Figure 5:
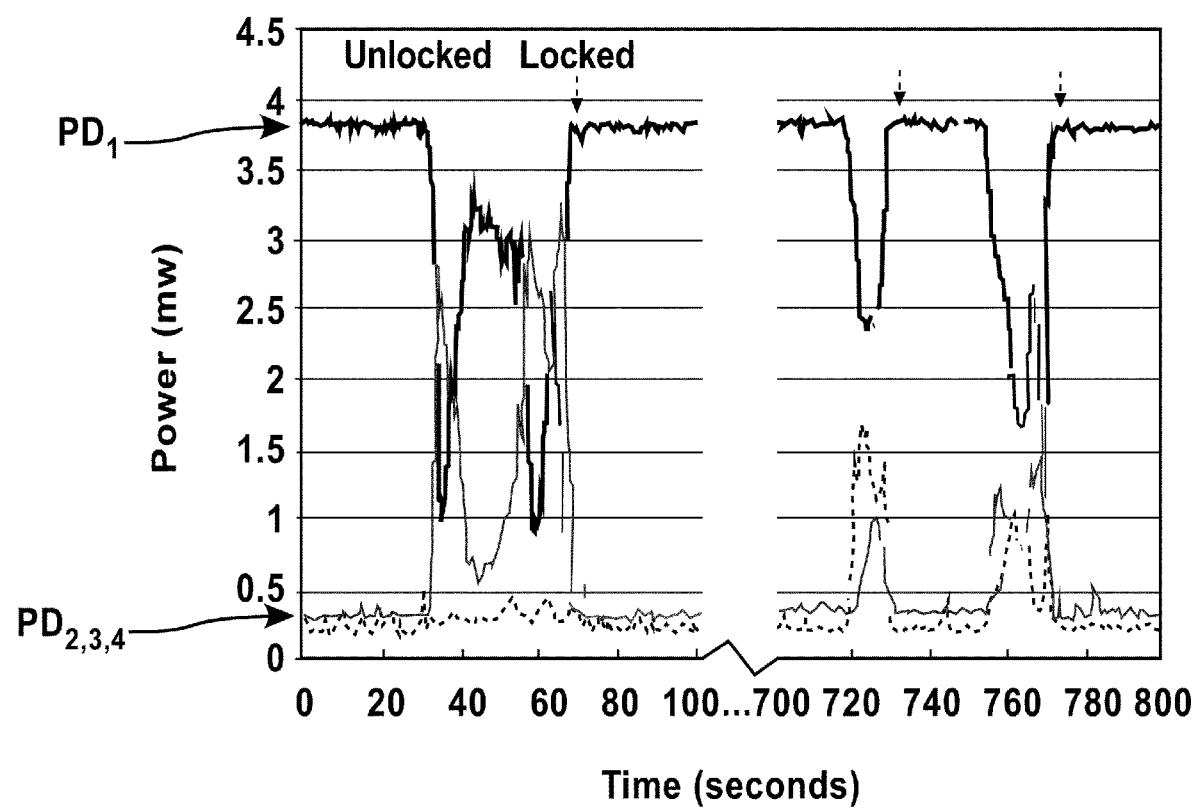
FIG. 5 shows results using the embodiment of FIG. 4, with and without the servo-controllers in operation.

FIG. 5 shows a composite of the outputs of all four detectors ($PD_1$ to $PD_4$) described above in reference to FIG. 4. One can see that when the feedback signals are blocked ("unlocked"), there is a random fluctuating output at each of the 2×2 fiber couplers. This follows, since, in the "unlocked" state, the differential phase shifts of the fiber bundle can vary over time, due to mechanical and thermal perturbations. This differential phase variation will result in a corresponding change in the optical output levels emerging for the two output ports of a given 2×2 fiber coupler. By extension, all the couplers in the tree architecture will have similar, yet random, fluctuations over time. This noise can occur for differential path-length differences as small as ≈lambda/4 or less (less than 1 micron in effective differential length). Hence, the composite combination of the tree architecture (the optical power level at $PD_1$) will, by conservation of energy, also fluctuate randomly over time—which is highly undesirable in terms of the performance of the communications link.

On the other hand, when the servo-controllers are enabled, or "locked," the output of the desired channel ($PD_1$ in figure) is maximized, and, in addition, is stable over time. Concomitantly, the output level of the other three detectors is driven to a null, which is also stable over time. The results shown in FIG. 5 demonstrate the ability of this embodiment to phase-lock a fiber bundle, which can form the front-end of a coherent optical receiver and result in stable output in real-time.

The results of this demonstration can be extrapolated to larger 1-d and 2-d arrays of fiber-bundle coherent optical receivers. As an example, assume that that are n fibers in the 1-d array. One can now see how additional 1-d arrays (say, k, 1-d arrays) can be "layered" parallel and adjacent to the first 1-d array, to result in an overall 2-d array, which, in this example, would consist of n×k total subapertures, or, pixels. This layering process is realized by taking the "final" output of, say, the 1-d layer #1—and the final output of the adjacent 1-d layer, say, layer #2—and combining this pair of outputs into a 2×2 fiber coupler. Now, using the same recipe as above, the net output of this 2×2 array, when properly phased, will also result in a single beam, which, in this example, is the coherent phasing of the first and second 1-d array layers.

By extension, one can now continue to extend this architecture to more layers, and, therefore, to a large effective 2×2 array of coherently combined outputs. Ultimately, one can then coherently combine and phase-lock all the pairs of layers, and, so on, to form a two-dimensional tree architecture. Depending on the application need, note that the cross-section of the 2-d array of fibers need not be circular or even symmetrical. Hence, the structure can be configured to be conformal to the platform of the end user.

One problem with the embodiment of FIG. 4 is that a failure of any component within block 125 can, in general, adversely affect more than one aperture 108. For example, the failure of $PD_2$ would adversely affect all apertures 108 depicted in this figure. Such degradations can be severe, resulting in a reduction in the performance of the receiver system S/N, as well as a reduction in the angular resolution of the ensemble. The embodiments of FIGS. 1 and 3 are preferable, in this regard, as the failure of a single component, such as a photodetector, is apt to adversely affect only a single aperture or lenslet 108 as opposed to adversely affecting a plurality of apertures or lenslets 108, resulting in a highly desirable "graceful degradation" property of the receiver system.

3. Optically Induced Phase Control of Fibers

There are several different classes of fiber-based amplifiers (labeled as elements FA in FIGS. 1 and 3 and as elements 141 in FIG. 4) that can be used in the embodiments described above. In what follows, we briefly describe four such examples.

3a. Doped Fiber Amplifiers

Initially, we discussed the use of commercial off-the shelf (COTS) rare-earth doped fiber amplifiers as gain-induced phase shifters. It was shown in Minden that this class of fiber amplifier, a laser pump source, selected to optical couple to a well-defined energy level of the doped fiber species (typically a rare-earth atom in a glass host fiber, such as Nd, Yb, Eb, etc.) will induce a population inversion in the dopant atom. This population inversion, as is well known, will result in optical amplification at a wavelength suitable for a given end-user application, such as optical communication and other photonics processors. It turns out that, fundamentally, a change in atomic population levels concomitantly gives rise to a change in the optical phase shift experienced by a signal beam in the medium. In the case of Minden and the present disclosure, both effects are used to advantage: the population inversion as a means of optical amplification, and, also, as a means to control the phase shift of a signal beam. These two features can be controlled by varying the degree of population inversion, which, in this case, is realized by varying the optical power in the pump laser. Without loss of generality, other effects can also control the optical phase, including thermal effects (due to the quantum defect of the given atomic system), induced also by variations in the laser pump power, which, simultaneously occur in varying degrees of magnitude and response time. In any case, the laboratory practice discussed above employed a COTS optical fiber amplifier using a rare-earth doped glass fiber. By extension, other classes of doped optical fibers can also be candidates as phase controlling elements in fiber-based receivers, etc.

3b. Stimulated Scattering Based Fiber Amplifiers

Another way of achieving optical phase shifting and gain in guided-wave and fiber structures can be realized via the mechanism of nonlinear optical effects in these structures. Examples here include the nonlinear refractive index mechanism, which is due to optically induced changes in the molecular structure of the fiber material, and, also, Stimulated Raman Scattering (SRS) as well as Stimulated Brillouin Scattering (SBS). These latter nonlinear optical effects, SRS and SBS, have been demonstrated in bulk as well as in guided-wave structures for many years, with application primarily as low-noise optical amplifiers and as wavelength converters, for long-haul fiber communication systems. However, the use of SRS and SBS as providing controllable optical phase shifts has not, to our knowledge, been considered for phase control of signal beams. In fact, all three examples of nonlinear induced phase shifts have, for the most part, been considered as deleterious, in that such self-induced effects typically lead to a reduction in the data rate (due to pulse spreading, etc.). Thus, much attention has been directed to minimize, if not completely eliminate, such optical phase shifts, primarily, by the photonics communications industries.

The optical communications community has investigated SRS and SBS for amplification of serial optical data streams through long optical fiber links for over 20 years. Distributed gain along the length of the fiber enables communication over very long fiber links (transoceanic, for example), since optical gain is necessary to overcome typical optical losses (on the order of 0.1 dB/km). All three means for optical gain (population inversion, SRS and SBS—all via laser pumping) are candidates for these telecommunication applications, given the realization of very high optical gains ($\approx$30 to 40 dB, limited by parasitics), with very low noise figures of merit. In fact, SRS gain is used in many telecommunications applications, owing to the distributed gain experienced by a data-carrying signal beam as it propagates through an optical fiber.

Given that the optical gains using SRS or SBS are comparable to that in COTS doped fibers (using population inversion mechanisms, as discussed above), the optically induced phase shifts via SRS or SBS mechanisms, as induced by controlling the laser pump power, are expected to be comparable in magnitude to that of the COTS fibers. This follows from the same fundamental considerations discussed above, namely, that the optical gain (or, loss) and the optical phase shift, are fundamentally related to each other. Moreover, the response time of these nonlinear effects is extremely fast, so that this mechanism will pose minimal, if any, limitation on the overall response of the fiber bundle receiver system to deleterious propagation-path distortions.

In SRS or SBS, a pump laser can provide gain and, by analogy to COTS optical fiber amplifiers, can also provide a means for optical phase control of an optical signal. As is well known, in SRS or SBS, a laser pump beam is coupled into a fiber, similar to the COTS fiber devices discussed above. In the presence of the pump laser, a signal beam will, therefore, experience gain or phase control as it propagates through the fiber.

It is well known, that in SRS and SBS interactions, the wavelength of the signal beam is required to be slightly shifted in wavelength relative to the pump laser wavelength, in order to experience optical gain. The required frequency offset of the signal wavelength is dependent on the acoustic and optical properties of the specific core and/or cladding fiber material, and, is tabulated for many glasses, crystals, and gaseous media. Using COTS fiber amplifiers, the wavelength shift between the pump and signal laser beams is determined by the atomic transitions of the dopant species, such as rare-earth-doped materials, as described in the initial embodiment herein. All these details are well known in the art.

The gain media for SBS and SRS need not necessarily be doped, so that pure materials can be used for the core and/or cladding. The SBS or SRS gain is realized by a specific wavelength detuning relative to the pump laser, typically on the order of 1 $cm^{-1}$ in the case of SBS, and, on the order of 100 $cm^{-1}$ to 1000 $cm^{-1}$, for SRS, respectively. (Note that the laser wavelength is on the order of 10,000 $cm^{-1}$, so that the pump/signal wavelength shift is very small).

Another basic difference between the COTS fiber amplifiers (discussed above), relative to SRS and SBS fiber amplifiers, is that the latter devices do not require that the pump laser be resonant with a specific set of energy levels in the gain medium (as is the case for rare-earth doped systems). Therefore, a key advantage of a SRS and SBS fiber system is that they can function over a very large range of signal wavelengths, limited only by the optical absorption of the core material (e.g., glass, gases, etc), so that operation over the visible into the IR can be realized. Hence, this embodiment can enable the invention to be used for a variety of wavelength-agile applications, such as laser communication at 1.5 µm, underwater applications (in the blue-green wavelength region), imaging and communication throughout the 3 to 5 µm spectral region, etc.

3c. Guided-Wave Structures.

The foregoing sections 3a and 3b describe the use of a rare-earth-doped solid glass fiber to realize gain and controllable optical phase shifts. As noted above, embodiments using SRS and SBS enable nonresonant media to be used for this invention. In the art, solid glass fibers and other materials have been used as guided-wave fiber amplifiers using SRS and SBS, especially in the photonics communication arena for long-haul fiber links, etc. As discussed above, such fiber amplifiers can also be used as optically controlled phase-shifting elements for this invention, since the gain and phase shift are fundamentally related, as discussed earlier. In addition to solids, other states of matter can be used as nonlinear optical media for SRS and SBS interactions. As we discuss herein, a relatively new class of optical fiber, with a hollow guiding core instead of a solid core, has been fabricated and is now commercially available.

Given this new class of hollow-core optical fiber, various gases can now be considered to provide the desired gain and phase control by filling the hollow core with the desired gas. Gases are desirable candidates, since background optical absorption is essentially negligible relative to solid materials (glass, calcogenides, etc.). In addition, the threshold for optical breakdown is orders of magnitude greater than that in solids, enabling scaling of the system to high peak powers. Moreover, undesirable thermal-limiting mechanisms (e.g., resulting from background absorption) are essentially nonexistent. Furthermore, the response time for the SRS nonlinear process is extremely fast (picoseconds), resulting in an extremely high bandwidth for optical communication applications (>THz). This bandwidth also implies that the response time for the optical phase control is on the same temporal order, so that SRS and SBS optical process will, for all practical purposes, not pose any limitation on the bandwidth for adaptive wavefront compensation of a communications link, including phase errors within a fiber bundle as well as along an atmospheric path.

An example of an optical fiber structure that can be used for this embodiment is a so-called Hollow-Core Photonic Crystal Fiber (HC-PCF). These novel and recently demonstrated structures enable light to propagate through a gas-filled, hollow-core fiber with minimal optical loss and dispersion, and is well known in the art. Such fiber structures have been demonstrated to transmit very high-peak power, temporally short, optical pulses, with minimal pulse shape distortion through passive guided structures over long distances (in these proof-of-principle demonstrations to date, there is no pump beam present; only a temporally encoded signal beam). In this case, extreme care is incorporated into the design of this fiber system to minimize, if not eliminate, SRS and SBS, as these mechanisms are considered delirious for this class of application (via choice of gas, gas pressure, etc.). By complete contrast, in our invention, we desire to induce optical phase shifts, for phase control of a fiber bundle. In other demonstrations, SRS and SBS gain in gas-filled HC-PCFs has been studied, with application to distributed optical amplification for long-fiber communication systems (similar to the COTS fiber amplifiers discussed earlier). Here, too, optical phase shifts and dispersion are deemed undesirable, as they could reduce the effective communications bandwidth over long-haul links (lengths of order 10s to 100s km). By complete contrast, in our case, we desire controllable phase-shifts to be imposed onto a signal beam over relatively short-length fibers (order, meters). Therefore, the design space for our invention is precisely counter to that for the prior-art long-haul amplification systems (parameters include, for example, choice of gas, gas pressure, pump-signal frequency shift, fiber length, etc.).

In a preferred embodiment herein, an array (bundle) of these HC-PCFs can serve to control the wavefront of an incident optical beam. In this embodiment, one fills the HC-PCF with a suitable gas (methane, hydrogen, deuterium, etc.), as determined by the design rules of the specific application, such as the desired signal wavelength, pump laser parameters, etc. Equivalently, one can place the fiber array into a gas-filled container with optical windows for access to both ends of the bundle. The pump laser can be in the form of a fiber laser, a laser diode, etc, so that a very compact phase-control module can be realized.

In any case, any or all the system architectures described herein can be employed to utilize this class of guided-wave bundle for the overall system application. This includes the various wavefront error sensing approaches, such as closed-loop geometries, using slope-detection sensors, multi-dither systems (for frequency tagging of each pixel), as well as open-loop, feed forward, approaches, such as via the use of genetic algorithms, etc.

As is the case of the COTS fiber amplifier bundle discussed earlier, the polarization of the composite optical beam exiting the fiber bundle must be the same for all fibers in the array. The system performance will otherwise degrade to the extent that the beams exiting the overall structure become randomly polarized relative to other fibers in the bundle. Polarization controllers, as shown in FIG. 1, can be used to control and maintain the polarization of the fibers. In addition, polarization-preserving HC-PCF fibers can be used, analogous to arrays of polarization-maintaining solid-core fiber amplifiers discussed above.

4. Conformal Optical Receivers

The basic multiple fiber coherent receiver system of FIG. 1, 3 or 4 can be integrated into a conformal structure, and, need not be constrained to, be configured to, or attached to a single gimbal or other flat surface or aperture. See FIG. 6 where the array of lenslets 12 is a two dimensional array disposed on a non-planar (for example) surface of an airplane. Of course, the notion of replacing a bulky, expensive, large moment-of-inertia (and mechanically rigid) lens mounted a gimbal with a fiber bundle is an important aspect of this invention. Moreover, the use of fibers to form an equivalent aperture circumvents the need for free-space optical relay optics and telescopes. Given the freedom, flexibility, robustness and size of fibers, the fibers (with optional micro-lens collectors) can be placed along, or embedded into, conformal surfaces of arbitrary shape. Since each fiber is phase-shifted relative to a reference fiber phase, path-length differences (modulo $2\pi$) will be minimized upon system convergence. Therefore, upon convergence of our system, an arbitrary distribution of 1-d of 2-d fibers along a surface will function as a perfectly flat optical aperture with perfect connectivity to all its subapertures.

Figure 6:
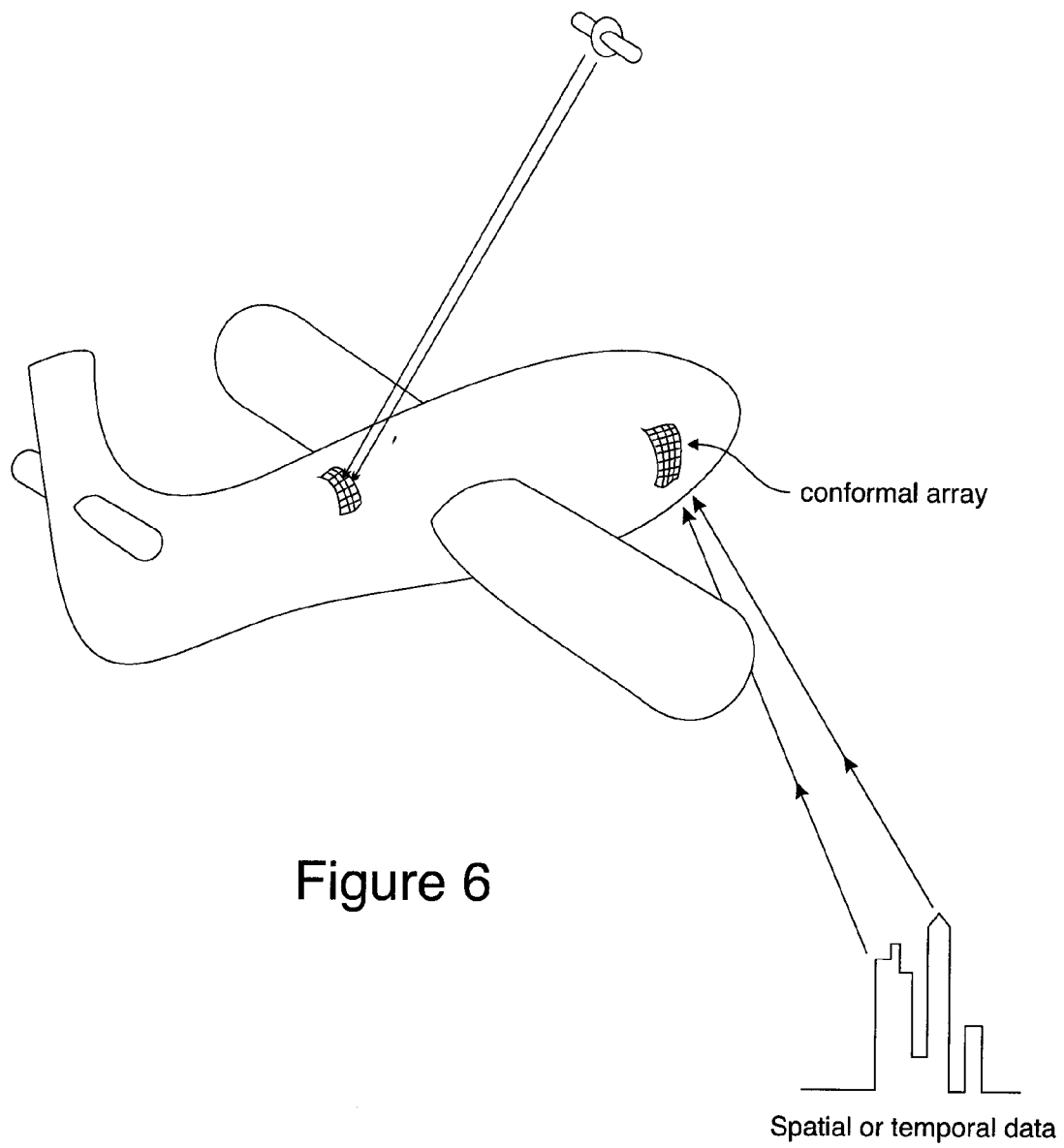
FIG. 6 is a schematic diagram of an embodiment of a compensated receiver mounted conformal to an arbitrary surface on a platform (e.g., an aircraft, a satellite). Given the phase-compensation feature of the multi-fiber array, this conformal optical aperture will effectively become equivalent to a diffraction-limited aperture owing to the phase-compensated functionality of the system. Low-bandwidth handshaking protocols can be implemented to determine the apertures necessary to receive an incoming signal or image. In this manner, the laser-pump source (which controls the phase and provides optical amplification) can be selectively activated to maximize system efficiency.

FIG. 6 shows an example where a fiber-based optical receiver is configured conformal to the outer skin of an airborne platform. In this embodiment, one can strategically locate a fiber (or a small array of fibers) conformal to one surface of an irregularly shaped surface, resulting in an embedded and distributed detector aperture. Another similar array can be installed on a totally different surface (even removed from the field-of-view of the first array), etc. In this manner, a single optical detector and "global" post-processing subsystem can be use to detect an incoming laser-encoded beam from one of more directions, perhaps, even simultaneously. Logic circuits, in concert with RF and/or GPS information, can optimize system wall-plug efficiency by powering only the laser-pumped fibers that are in the line-of-sight (field-of-view) of the intended remote transmitter or sensor. In addition, one can program which specific conformal patches become engaged, so that, a given remote transmitter can communicate with the receiver platform at a predetermined time and location.

Since the system employs multiple fibers and fiber amplifiers as a distributed, sometimes redundant, receiver aperture, the general receiver system is robust, with a graceful degradation functionality. This follows, since, even as one fiber in a given bundle may fail (e.g., failure of the laser pump, mechanical damage to the fiber itself, etc.), the remaining fibers can still be phased up to result in a coherent aperture (albeit, with a slightly modified far-field pattern). An onboard microprocessor can be employed to cut off power to the pump laser of any failed fibers in the bundle, hence minimizing extraneous drive power.

There are several means by which an ensemble of non-contiguous, conformal multi-fiber "patches" can be routed to a common (i.e., global) receiver processor/WES/detector on a given platform. Note that this global processor can be situated anywhere, and, need not be co-located with any of the conformal detector arrays. As an example, assume that the overall platform consists of k such independent conformal patches. We next describe two embodiments that can result in a single output signal, derived from the entire ensemble of conformal patch arrays.

In one embodiment, each independent fiber array (a bundle of N fibers) is routed as a respective independent bundle of fibers to a common M×2 optical coupler, where M is equal to the total number of fibers that comprise the entire receiver system (e.g., if each conformal patch consists of N fibers, then, M=k×N). The pair of output fibers from the M×2 coupler is then configured, as is the N×2 architecture, such as that shown in FIG. 3. In the other case, a single WES, with M frequency-tagged outputs, provides the necessary feedback loops to drive the entire system of conformal receivers.

A less complex and bulky embodiment also follows from that of FIG. 3. Instead of routing all N fibers from this conformal-patch receiver to a common processor (and, hence, M total fibers), configure each conformal receiver with a dedicated N×2 optical coupler. In this case, the single composite output fiber signal (not phased at this juncture) from the coupler is routed to a common receiver. Therefore, only one fiber from each conformal patch aperture is required to route the necessary information to a global processor, instead of N fibers, as above. At the common global processor, the set of k such fibers enters a k×2 optical coupler, with one of the coupler's output fibers entering WES processor, and the other fiber providing the final, phase-coherent, composite detector signal. This global receiver (now with k effective inputs), therefore, is configured exactly as that of the receiver shown in FIG. 3 (with k inputs, instead of N inputs). The WES provides a set of M uniquely frequency-tagged feedback signals, where each of the N=M/k subgroups are routed to its respective conformal patch for phase control. Note that all M feedback channels are electrical, not optical. Of course, the electrical feedback information from the global processor to the respective conformal receivers can be relayed and encoded in other ways, as is known in the art. Examples include wireless local area networks, as well as conventional optical fiber links.

In all the embodiments herein, especially those that involve conformal arrayed receivers and multiple conformal patches, we are assuming that the physical length differences amongst any of the fibers in the entire ensemble are much less than the length light would travel during an encoded "bit." That is, if one were to simultaneously launch a single pulse down all the M fibers in the system, all the M output pulses would exit the fiber ensemble simultaneously—otherwise, a temporal spreading of the pulse would result, since each fiber would impose a slightly different propagation delay, which would reduce the communication bandwidth, or, data-handling rate, of the optical link. As a numerical example, if the maximum length differential were on the order of 0.1 mm (100 µm), then the maximum communication bandwidth would be limited to ≈3 THz. This follows, since light travels 30 cm [300 mm] in a ≈nsec, so 0.1 mm corresponds to 1/3000 of a nsec, which translates to a bandwidth of ≈3 THz, which is more than sufficient for present and envisioned next-generation links.

In principle, in the case of very high data-rate communication links, the physical difference in fiber length added to the difference of propagation distance from the transmitter to any of the receiver subapertures, will limit the bandwidth of the link. This bandwidth limitation will apply even if the coherent receiver functions ideally (i.e., a zero net phase difference). This follows, since the receiver will minimize all phase differences subject to modulo $2\pi$. However, even if this phase difference is zero, the physical length difference can, in general, be nonzero. That is, if the path-length differences are equal to an integral number of optical wavelengths (1, 2, 3, . . . etc.), the phase difference will be identically equal to zero, even though the physical length difference can be substantial. It is well known that the maximum system bandwidth, based on such photon transit time differences is given by $BW_{max}=c/(n\times\Delta L)$, where $\Delta L$ is the maximum overall path-length difference. This follows when differences in the photon transit time from one fiber to the detector and another fiber to the same detector begins to exceed the shortest temporal difference between a pair of pulses: e.g., $BW_{max}=c/(n\times\Delta L)$. Since this path-length difference is geometry dependent (i.e., a function of beam arrival angles—azimuth and elevation, or, "az-el"), the path-length must be properly set to provide the desired $BW_{max}$. There are various compact, controllable true-time delay networks that can provide the required, programmable, path-length corrections across a given array, based on the az-el receive angle (see, e.g., U.S. Pat. No. 6,760,512 which issued on Jul. 6, 2004 to David M. Pepper, "Electro-optical programmable true-time delay generator").

5. Basic Compensation for Distortions Imposed by a Fiber Bundle Receiver/Amplifier onto Image-Bearing Information Heretofore, it has assumed that the useful information is strictly in the time domain. That is, the data is temporally encoded onto a pristine laser beam at the source location of the link. We now consider the case where the useful information is in the form of a two-dimensional spatial image, say an image of an orbiting satellite, an airborne platform, or a terrestrial object. The primary goal here is to collect the light from the object at the aperture at a receiver and coherently amplify the light for subsequent viewing, with diffraction-limited performance. A second goal is to yield a high fidelity, intensified image at the receiver output, with minimal phase distortion imposed by the receiver and amplifier.

Figure 7:
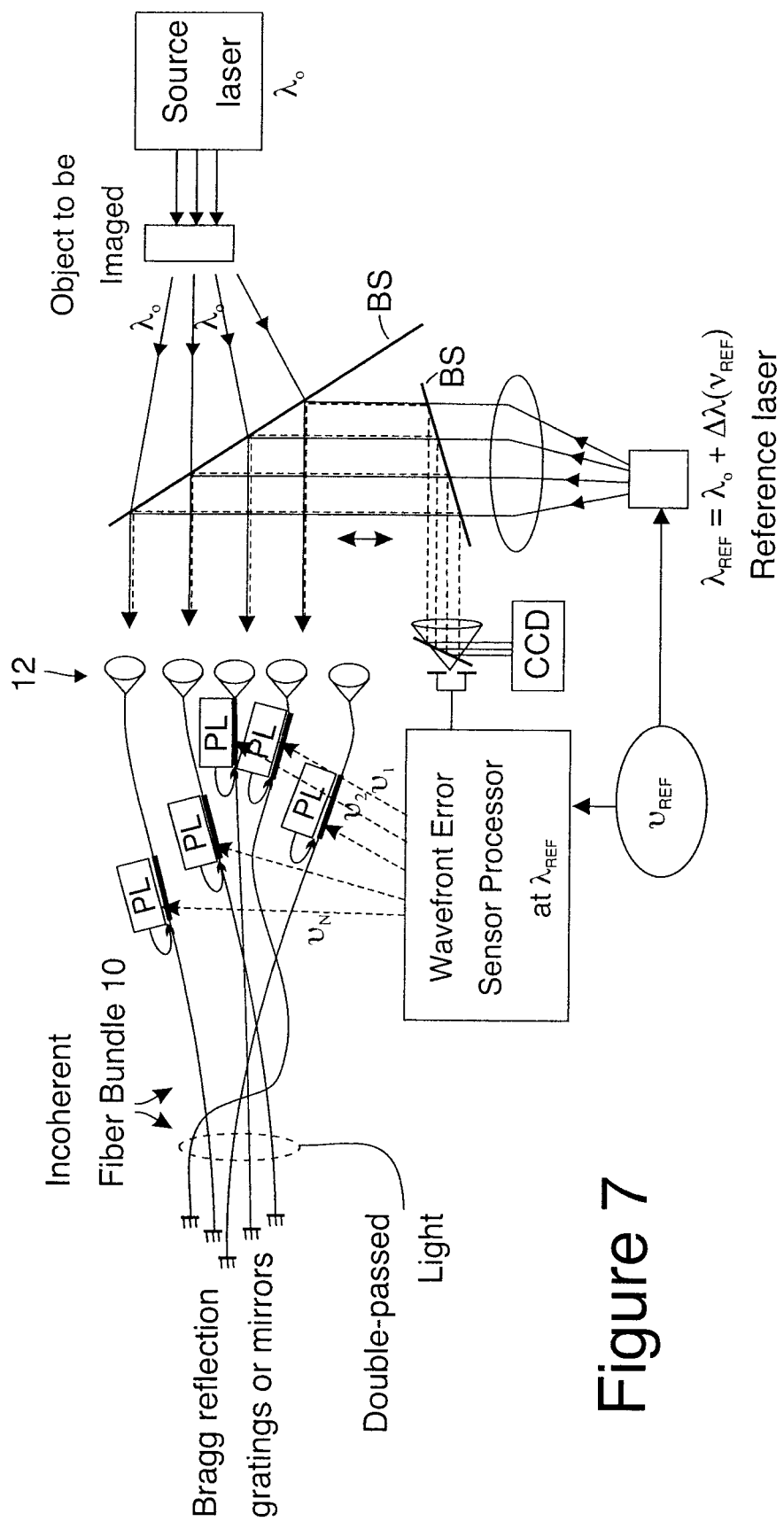
FIG. 7 is an embodiment of a compensated receiver to enable imaging of an object, as well as optical image amplification. The object to be imaged is illuminated at a wavelength of lambda-sub-zero and the received light is incident upon the input aperture of the fiber bundle. Phase distortions are compensated within the fiber bundle by providing a local reference at a wavelength of lambda-sub-ref, using any of the compensation techniques shown in FIG. 1, 2 or 4. In addition to phase compensation of the bundle, spatial image registration is required to avoid scrambling of an image by the fiber bundle, which would render the imaged object unrecognizable. Double-passing each fiber within the bundle, thereby, provides image registration assuring that the pixel-to-pixel mapping of the object is preserved upon entering and exiting the fiber bundle.

A preferred embodiment is shown in FIG. 7. Here, an object produces a spatially encoded beam, which is incident upon the fiber bundle receiver. Note that the fiber bundle 10 is configured so that an input beam traverses the fiber bundle 10 in a double-pass manner. As an example, light that enters the input end of the receiver bundle through a lenslet array 12, propagates through the given fiber, and is subsequently reflected at the opposing end of that same fiber (e.g., reflected within each fiber by a Bragg reflection grating or external mirror). The reflected light then re-traverses the same respective fiber within the fiber bundle 10, emerging out of the same end (and, same fiber) of the bundle as the initially received beam at an optional lenslet array 12. A beam splitter BS then couples a portion of the double-passed light into a wavefront error sensor/processor, and another portion of the light into a detector, preferably a CCD detector, for viewing the compensated and intensified object.

Note that two different laser beams are incident onto the input apertures 12 of the bundle. One beam, at a wavelength of $\lambda_O$, is the light that emerges from the object to be imaged (as shown on the right-hand side of FIG. 7) and collected by the input aperture 12 of the fiber bundle. This is the desired light to be imaged and intensified. A second beam, at a wavelength of $\lambda_{ref}$, is also incident into the receiver aperture. This beam, typically, a diffraction-limited, plane-wave beam, serves as a reference beam for the fiber bundle phase-compensation system. This reference beam is equivalent to the beam incident onto the embodiments shown in FIG. 1 or 3. This reference beam is temporally encoded (as is the beam incident to the receivers of FIGS. 1 and 3). The temporal encoding here provides a means to frequency-tag, and, thus, differentiate the overall reference beam from the image-bearing beam at $\lambda_O$.

In order for the receiver to faithfully produce a phase-distortion-free image, two conditions must be met. First, the optical phasefront of a plane-wave beam that propagates, and, therefore, "samples," the path distortions, through the fiber bundle must be preserved (and, additionally, amplified). This requirement is exactly the same condition that the must be satisfied by above embodiments in the case of a temporally encoded beam. When this condition is met, the fiber bundle will produce a diffraction-limited, amplified output beam. That is, the fiber bundle will not impose differential phase shifts amongst the fibers within the bundle.

Referring to FIG. 7, a diffraction-limited reference beam (e.g., a plane wave), at a wavelength of $\lambda_{ref}$, is injected into the fiber bundle 10 at its input aperture array, 12. The beam double-passes the fiber bundle 10, with the resultant (now-distorted) beam having sampled the phase distortions imposed by the fiber bundle. This beam is then injected into the wavefront error system/processor. As before, the feedback control system forms a set of parallel servo-loops which, taken together, compensates for the phase distortions upon convergence of the ensemble of the servo-loops. Hence, the result is that the fiber bundle 10 will not distort a beam as it propagates through the bundle. The reference plane-wave beam, as discussed above serves this need, and, the embodiments discussed above (in the case of a temporally encoded beam) can be imposed herein.

In order to recognize and view the image, a second condition that must be satisfied pertains to the mapping of the input and output pixels that comprise the bundle. That is, each pixel across the input aperture of the fiber bundle must remain in the same relative spatial position (to all the other pixels or fibers) at the output end of the fiber bundle. This one-to-one mapping pixel correspondence must meet in order to assure that all the pixels (i.e., fibers) that define a given object remain unchanged in a spatial sense at both ends of the bundle. Unless this condition is met, the output beam (even though corrected for phase shifts by the reference beam above), will emerged as a "scrambled" image, which would be, most likely, completely unrecognizable.

Referring again to FIG. 7, this second condition is automatically met by the double-pass configuration of the fiber bundle 10. That is, regardless of any spatial reordering of the input and opposing ends of the fiber bundle 10, the light, upon reverse transit back through the bundle, will emerge from the front end of the bundle in the precise spatial arrangement as it was initially. One can view this configuration as a simple time-reversal system. The reflected beams at the opposing end of the bundle will retrace their initial their respective paths exactly, as they approach and emerge from the original "input" end of the bundle 10. It is as if one took a video of a beam as it travels down the bundle 10, and, subsequently, played the same video backwards. That is, by virtue of the reflections at the end of the bundle 10, the beams all retrace their initial trajectories back through the bundle 10 as if time were reversed—thereby guaranteeing preservation of the spatial ordering of all the pixels, or fibers, that comprise the image.

In conclusion, as can be seen in this FIG. 7, and, additionally, by virtue of the preceding discussion, the fiber bundle, in this embodiment, therefore provides for image—free of any and all phase and spatial mapping distortions within the fiber bundle receiver.

While the present disclosure describes various techniques and embodiments, these techniques and embodiments are to be understood as illustrative and do not limit the scope of this technology. Many variations, modifications, additions and improvements of the described embodiments are possible. For example, those having ordinary skill in the art will understand that the process parameters, materials, and dimensions are given by way of example only. The parameters, materials, and dimensions can be varied to achieve the desired structures as well as modifications, which are within the scope of the claims. Variations and modifications of the embodiments disclosed will now suggest themselves to those skilled in the art. The disclosed embodiments explain the principles of the invention and its practical application to thereby enable others skilled in the art to utilize the disclosed technology in various embodiments and with various modifications as are suited to the particular use contemplated. It is intended that the appended claims be construed to include other alternative embodiments of the invention except insofar as limited by the prior art.

What is claimed is:

1. A coherent laser receiver for receiving encoded light from a remote source, the light from the remote source propagating over an aberrated path situated between said remote source of the encoded light and the coherent receiver, the coherent laser receiver comprising:
- a bundle of optical fibers arranged in an array, wherein the fibers in the array are arranged to receive light, as encoded from said remote source and received via said aberrated path, the encoded light from said remote source is received by at least a majority of the fibers in the array;
- a plurality of light amplifiers for amplifying the received encoded light;
- a control apparatus for coherently combining a composite output of the bundle of optical fibers, the apparatus including a single detector for detecting a portion of the composite output, an output of the single detector being utilized to control the plurality of light amplifiers so that all differential phases among individual fibers in the bundle are minimized by the plurality of light amplifiers; and
- a coherent detector responsive to the composite output of the bundle for providing an output signal representative of the encoded information from the source.

2. A coherent laser receiver for receiving encoded light from a remote source, the light from the remote source propagating which may have propagated over an aberrated path situated between said remote source of the encoded light and the coherent receiver, the coherent laser receiver comprising:
- a bundle of optical fibers arranged in an array,
- wherein the fibers in the array are arranged to receive light, as encoded from said remote source a distant optical transmitter and received via said aberrated path, the encoded light from said remote source the distant optical transmitter or is/received by at least a majority of the fibers in the array;
- a plurality of light amplifiers for amplifying the received encoded light;
- a control apparatus for coherently combining a composite output of the bundle of optical fibers, the apparatus including at least one detector for detecting a portion of the received encoded light, an output of the at least one detector being utilized to control the plurality of light amplifiers so that differential phases among individual fibers associated with said at least one detector in the bundle are minimized by said light amplifiers; and
- a coherent detector responsive to the composite output of the bundle for providing an output signal representative of the encoded information from the source.

3. The coherent laser receiver of claim 2 wherein the plurality light amplifiers comprise a plurality of fiber amplifiers, each of the plurality of fiber amplifiers having an associated pump laser driven by said control apparatus.

4. The coherent laser receiver of claim 3 wherein the fiber amplifiers use rare earth doping for amplification.

5. The coherent laser receiver of claim 3 wherein the fiber amplifiers use stimulated scattering for amplification.

6. The coherent laser receiver of claim 2 further including a plurality of polarization controllers for insuring the composite output of the fiber bundle is of a common or single polarization.

7. The coherent laser receiver of claim 2 wherein each fiber in the optical bundle has a associated lenslet whose diameter and array packing fraction are selected to define a desired field of view and spatial resolution of the coherent laser receiver.

8. The coherent laser receiver of claim 2 wherein each fiber in the optical bundle has a single spatial mode to provide for diffraction limited performance of the coherent laser receiver.

9. The coherent laser receiver of claim 2 wherein a receiving end of each fiber in the bundle of fibers is disposed in a non-planar configuration conformally on a non-planar surface of a vehicle or platform.

10. A coherent laser receiver for receiving encoded light which may have propagated over an aberrated path situated between a source of the encoded light and the coherent receiver, the coherent laser receiver comprising:
- a bundle of optical fibers arranged in an array, wherein the fibers in the array are arranged to receive light, as encoded from a distant optical transmitter or reflective surface, the encoded light from the distant optical transmitter or reflective surface is received by at least a majority of the fibers in the array;
- a plurality of light amplifiers for amplifying the received encoded light; a control apparatus for coherently combining a composite output of the bundle of optical fibers, the apparatus including at least one detector for detecting a portion of the received encoded light, an output of the at least one detector being utilized to control the plurality of light amplifiers so that differential phases among individual fibers associated with said at least one detector in the bundle are minimized by said light amplifiers; a coherent detector responsive to the composite output of the bundle for providing an output signal representative of the encoded information from the source;
- wherein each fiber in the bundle has a light receiving/transmitting end and a light reflecting end, the encoded light entering the light receiving/transmitting ends of the fibers and being amplified in the fibers before exiting the receiving/transmitting ends of the fibers in bundle then being applied to the control apparatus, wherein the source of the encoded light is an object to being imaged, the encoded light including a plane wave reference beam whose function is to sample differential phase shifts in the bundle of optical fibers, the plane wave reference beam being distinguishable from a source beam used to illuminate the object to being imaged.

11. The coherent laser receiver of claim 2 wherein said at least one detector comprises a single detector.

12. A coherent receiving method for coherently receiving encoded light from a remote source, the light from the remote source propagating which may have propagated over an aberrated path situated between a source of the encoded light and a coherent laser receiver, the coherent receiving method comprising:
- receiving encoded light, as encoded from said remote source a distant optical transmitter or reflective surface and received via said aberrated path, the encoded light from said remote source the distant optical transmitter or reflective surface being received by at least a majority of fibers in a bundle of optical fibers;
- amplifying the received encoded light in a plurality of light amplifiers each associated with one of the fibers in said bundle;
- coherently combining a composite output of the bundle of optical fibers by a control apparatus having at least one detector for detecting a portion of the received encoded light, an output of the at least one detector being utilized to control the plurality of light amplifiers so that differential phases among individual fibers in the bundle are minimized by said light amplifiers; and coherently detecting the composite output of the bundle for providing an output signal representative of the encoded information from the source.

13. The method of claim 12 wherein the plurality light amplifiers comprise a plurality of fiber amplifiers, each of the plurality of fiber amplifiers having an associated pump laser driven by said control apparatus for pumping an associated fiber amplifier.

14. The method of claim 13 wherein the fiber amplifiers use rare earth doping for amplification.

15. The method of claim 13 wherein the fiber amplifiers use stimulated scattering for amplification.

16. The method of claim 12 further including a plurality of polarization controllers for insuring the composite output of the fiber bundle is of a common or single polarization.

17. The method of claim 12 wherein each fiber in the optical bundle has a associated lenslet whose diameter and array packing fraction are selected to define a desired field of view and spatial resolution of the coherent laser receiver.

18. The method of claim 12 wherein each fiber in the optical bundle has a single spatial mode to provide for diffraction limited performance of the coherent laser receiver.

19. The method of claim 12 wherein a receiving end of each fiber in the bundle of fibers is disposed in a non-planar configuration conformally on a non-planar surface of a vehicle or platform.

20. A coherent receiving method for coherently receiving encoded light which may have propagated over an aberrated path, situated between a source of the encoded light and a coherent laser receiver, the coherent receiving method comprising:
receiving encoded light, as encoded from a distant optical transmitter or reflective surface, the encoded light from the distant optical transmitter or reflective surface being received by at least a majority of fibers in a bundle of optical fibers;
amplifying the received encoded light in a plurality of light amplifiers each associated with one of the fibers in said bundle;
coherently combining a composite output of the bundle of optical fibers by a control apparatus having at least one detector for detecting a portion of the received encoded light, an output of the at least one detector being utilized to control the plurality of light amplifiers so that differential phases among individual fibers in the bundle are minimized by said light amplifiers; and coherently detecting the composite output of the bundle for providing an output signal representative of the encoded information from the source;
wherein each fiber in bundle the has a light receiving/transmitting end and a light reflecting end, the encoded light entering the light receiving/transmitting ends of the fibers and being amplified in the fibers before exiting the receiving/transmitting ends of the fibers in bundle then being applied to the control apparatus, wherein the source of the encoded light is an object to being imaged, the encoded light including a plane wave reference beam whose function is to sample differential phase shifts in the bundle of optical fibers, the plane wave reference beam being distinguishable from a source beam used to illuminate the object to being imaged.

21. The coherent laser receiver of claim 2 wherein said at least one detector comprises a single multi-pixel detector.

22. The coherent laser receiver of claim 2 wherein said remote source is a remotely situated laser.

23. The coherent laser receiver of claim 2 wherein said remote source is a reflective surface of a remote object.

24. The coherent laser receiver of claim 23 wherein the remote object is illuminated by a laser beam emitted from a transmitter associated with the coherent laser receiver.

\* \* \* \* \*